(12) United States Patent
Brown (10) Patent No.: US 7,850,050 B2
(45) Date of Patent: Dec. 14, 2010

(54) LIQUID DISPENSING APPARATUS AND DEVICE

(75) Inventor: Curtis L. Brown, Lancaster, PA (US)

(73) Assignee: McNeil-PPC, Inc., New Brunswick, NJ (US)

( * ) Notice: Subject to any disclaimer, the term of this patent is extended or adjusted under 35 U.S.C. 154(b) by 726 days.

(21) Appl. No.: 11/525,304

(22) Filed: Sep. 22, 2006

(65) Prior Publication Data

US 2008/0073377 A1 Mar. 27, 2008

(51) Int. Cl.
*B67D 7/06* (2010.01)
(52) U.S. Cl. .................. 222/205; 222/207; 222/211
(58) Field of Classification Search ............ 222/205, 222/207, 211
See application file for complete search history.

(56) References Cited

U.S. PATENT DOCUMENTS 4,625,897 A * 12/1986 Wortley ...................... 222/205
4,971,226 A * 11/1990 Donoghue ................... 222/207
5,381,930 A * 1/1995 Kalabakas ................... 222/205
6,330,960 B1 12/2001 Faughey

FOREIGN PATENT DOCUMENTS

DE 3151522 7/1983

* cited by examiner

*Primary Examiner*—Kevin P Shaver
*Assistant Examiner*—Andrew P Bainbridge
(74) *Attorney, Agent, or Firm*—Karen G. Horowitz (57) ABSTRACT

The invention provides an apparatus and device for dispensing a quantity of liquid from a vessel. In one embodiment, an apparatus according to the invention comprises: a base portion adapted for insertion into an opening of a vessel, the base portion having a well extending into the base portion such that at least a portion of the well resides at within a body of the vessel when the base portion is inserted into the vessel opening; and a hollow spout portion extending from the well of the base portion away from the vessel opening when the base portion is inserted into the vessel opening, the spout portion having at least one opening such that a liquid within the body of the vessel may pass through the hollow spout, through the at least one opening, and into the well.

23 Claims, 8 Drawing Sheets

LIQUID DISPENSING APPARATUS AND DEVICE

BACKGROUND OF THE INVENTION

1. Technical Field

The invention relates generally to dispensing apparatuses, and more particularly, to an apparatus and device for dispensing a quantity of liquid from a vessel. The dispensing device of the invention is particularly useful in pouring from the device a predetermined and/or premeasured quantity of liquid, in that the device may be tipped to a greater angle than known devices before the quantity of liquid is dispensed from the device, thereby reducing the likelihood that the liquid will be spilled.

2. Background Art

Figure 1A:
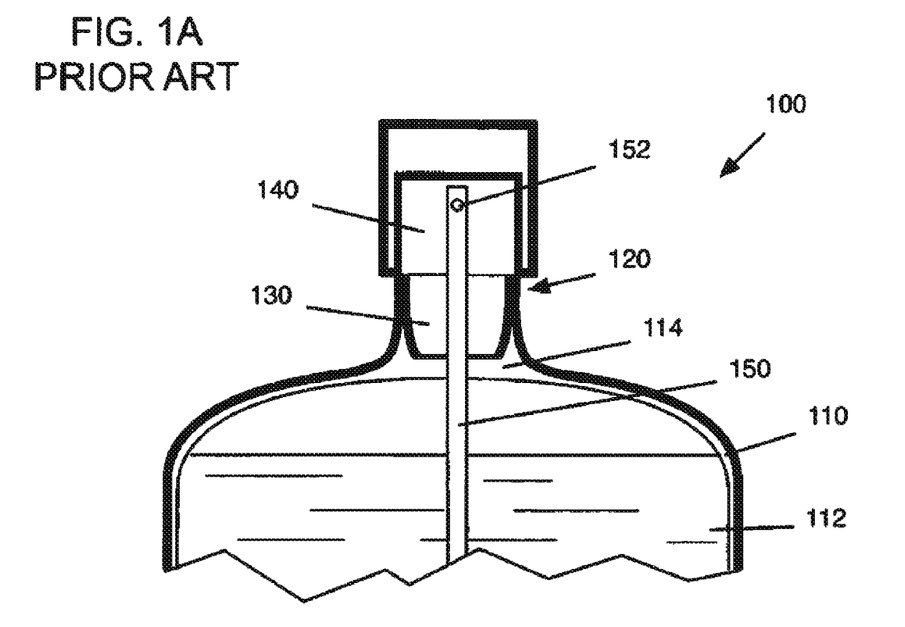
FIGS. 1A-C show various views of a known device.
Figure 1B:
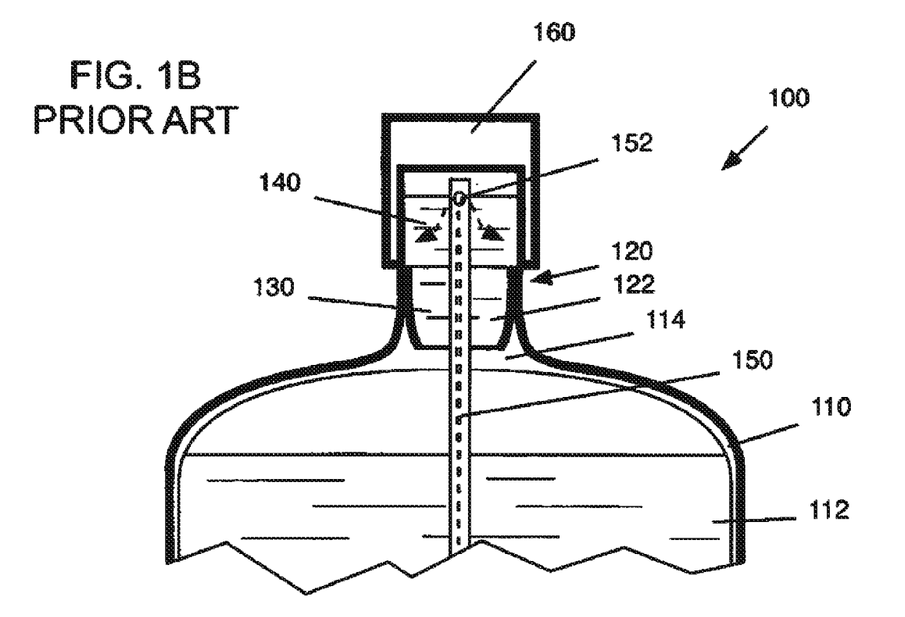
Figure 1C:
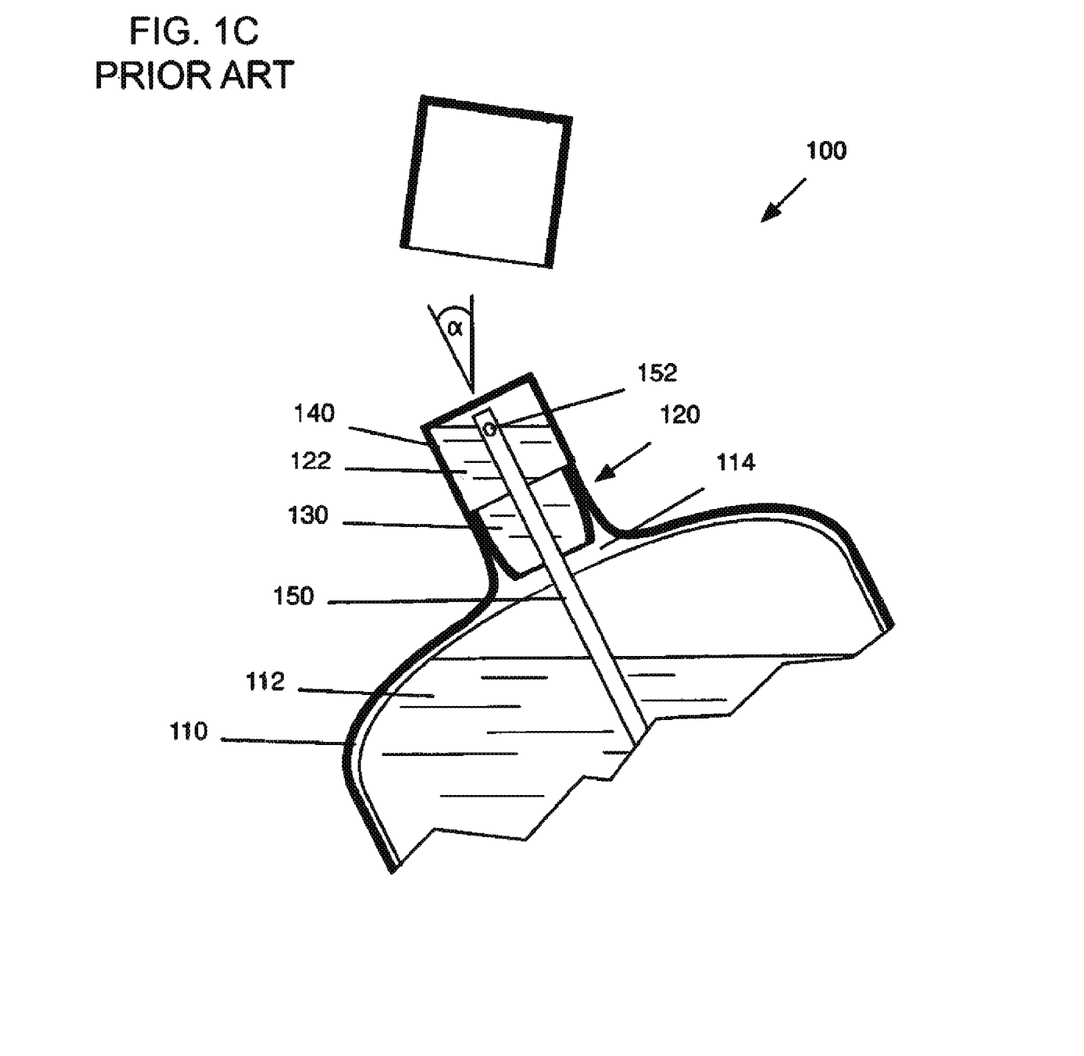

Devices for transferring a quantity of liquid from a larger liquid reservoir are known. For example, U.S. Pat. No. 5,381,930 to Kalabakas describes a dispensing device for dispensing a measured volume of liquid from a bottle. FIGS. 1A-C show a device 100 such as that described by Kalabakas. As shown in FIG. 1A, device 100 comprises a vessel 110 adapted to contain a reservoir of liquid 112 and a dispensing apparatus 120 adapted to fit within an opening 114 of the vessel 110. Apparatus 120 includes a lower well 130, an upper well 140, and a tube member 150 descending into vessel 110, such that, as shown in FIG. 1B, a quantity of liquid 122 may be transferred from vessel 110, through tube member 150, out at least one opening 152 in tube member 150, and into lower well 130 and upper well 140. Opening 152 prevents the level of liquid 122 from rising higher in upper well 140 than the level of opening 152.

Referring to FIG. 1C, once liquid 122 is so dispensed, it may be poured from device 100 by angling device 100 at an angle α. As can be seen, however, where the quantity of liquid 122 is relatively large, angle α (the "pouring angle") may be too shallow to allow liquid 122 to be poured from device 100 without risk of spilling. Typically, angle α is between about 45 degrees and about 55 degrees.

To this extent, a need exists for a dispensing apparatus and device that does not suffer from the defects of known apparatuses and devices.

SUMMARY OF THE INVENTION

The invention provides an apparatus and device for dispensing a quantity of liquid from a vessel.

A first aspect of the invention provides an apparatus for dispensing a quantity of a liquid from a vessel, the apparatus comprising: a base portion adapted for insertion into an opening of a vessel, the base portion having a well extending into the base portion such that at least a portion of the well resides at within a body of the vessel when the base portion is inserted into the vessel opening; and a hollow spout portion extending from the well of the base portion away from the vessel opening when the base portion is inserted into the vessel opening, the spout portion having at least one opening such that a liquid within the body of the vessel may pass through the hollow spout, through the at least one opening, and into the well.

A second aspect of the invention provides a device for dispensing a quantity of liquid from a liquid reservoir, the device comprising: a vessel including: a body adapted to contain a liquid reservoir; and an opening adapted to receive a dispensing apparatus; and a dispensing apparatus including: a base portion adapted for insertion into the opening of the vessel, the base portion having a well extending into the base portion such that at least a portion of the well resides at within the body of the vessel when the base portion is inserted into the vessel opening; and a hollow spout portion extending from the well of the base portion away from the vessel opening when the base portion is inserted into the vessel opening, the spout portion having at least one opening such that a liquid within the body of the vessel may pass through the hollow spout, through the at least one opening, and into the well.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides an apparatus and device for dispensing a quantity of liquid from a vessel.

Figure 2A:
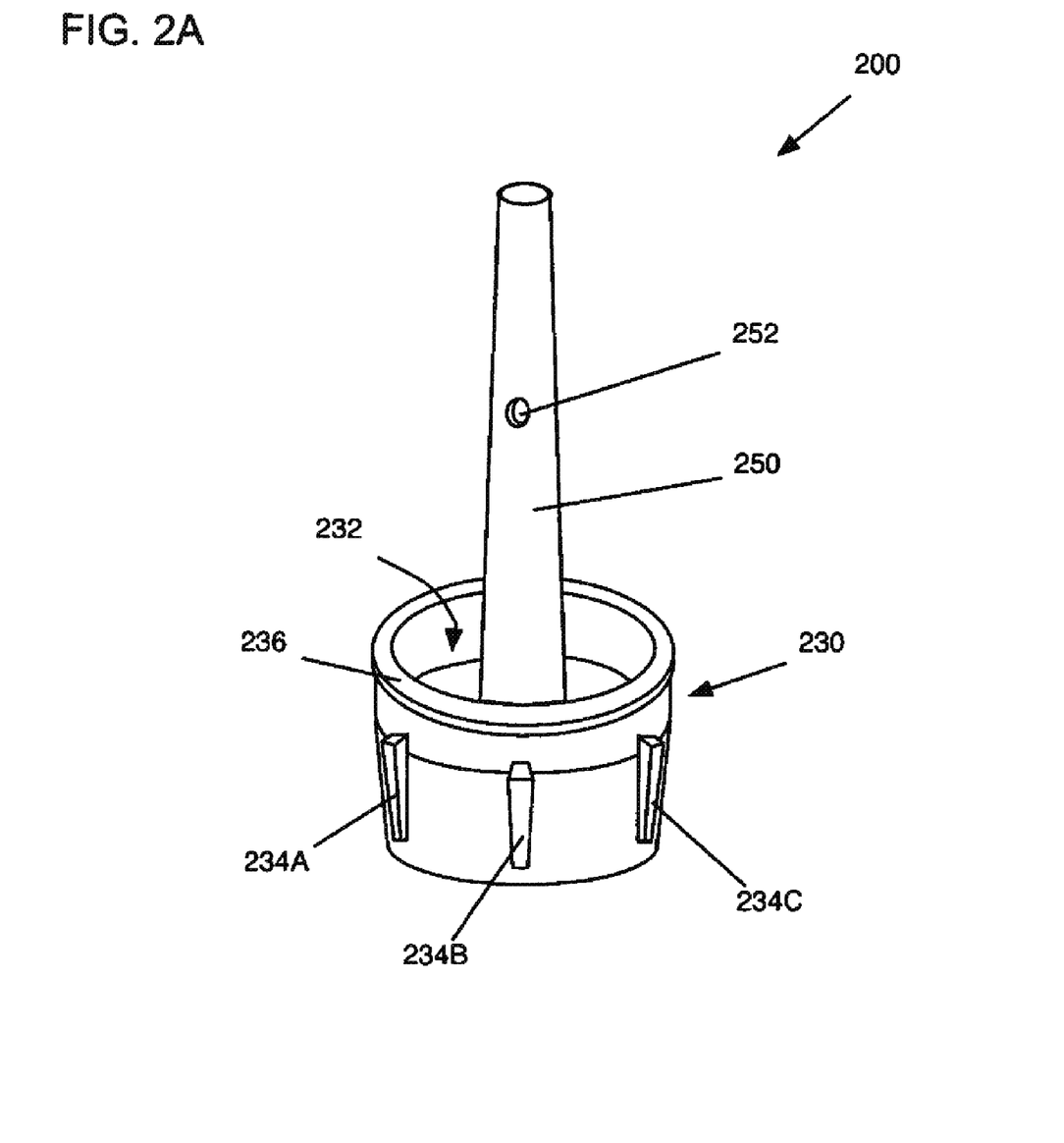
FIGS. 2A-D show various views of an apparatus according to an embodiment of the invention.

Referring now to FIGS. 2A-D, various views of an apparatus 200 according to an embodiment of the invention are shown. FIG. 2A shows a side perspective view of apparatus 200. As shown, apparatus 200 includes a base portion 230 having a well 232 on its inner surface. That is, well 232 comprises a depression within base portion 230. From a bottom surface of well 232 and extending upward is a hollow spout portion 250 having at least one opening 252 for passage of a liquid. Base portion 230 further includes a rim 236 and a plurality of ridges 234A-C, the functions of which will be described in greater detail below.

Apparatus 200 is preferably a one-piece molded apparatus and may comprise any number of materials, as will be recognized by one skilled in the art. A particularly preferred material is polypropylene. Another suitable material is linear low-density polyethylene. Similarly, apparatus 200 may be sized for use with vessels of any size.

Figure 2B:
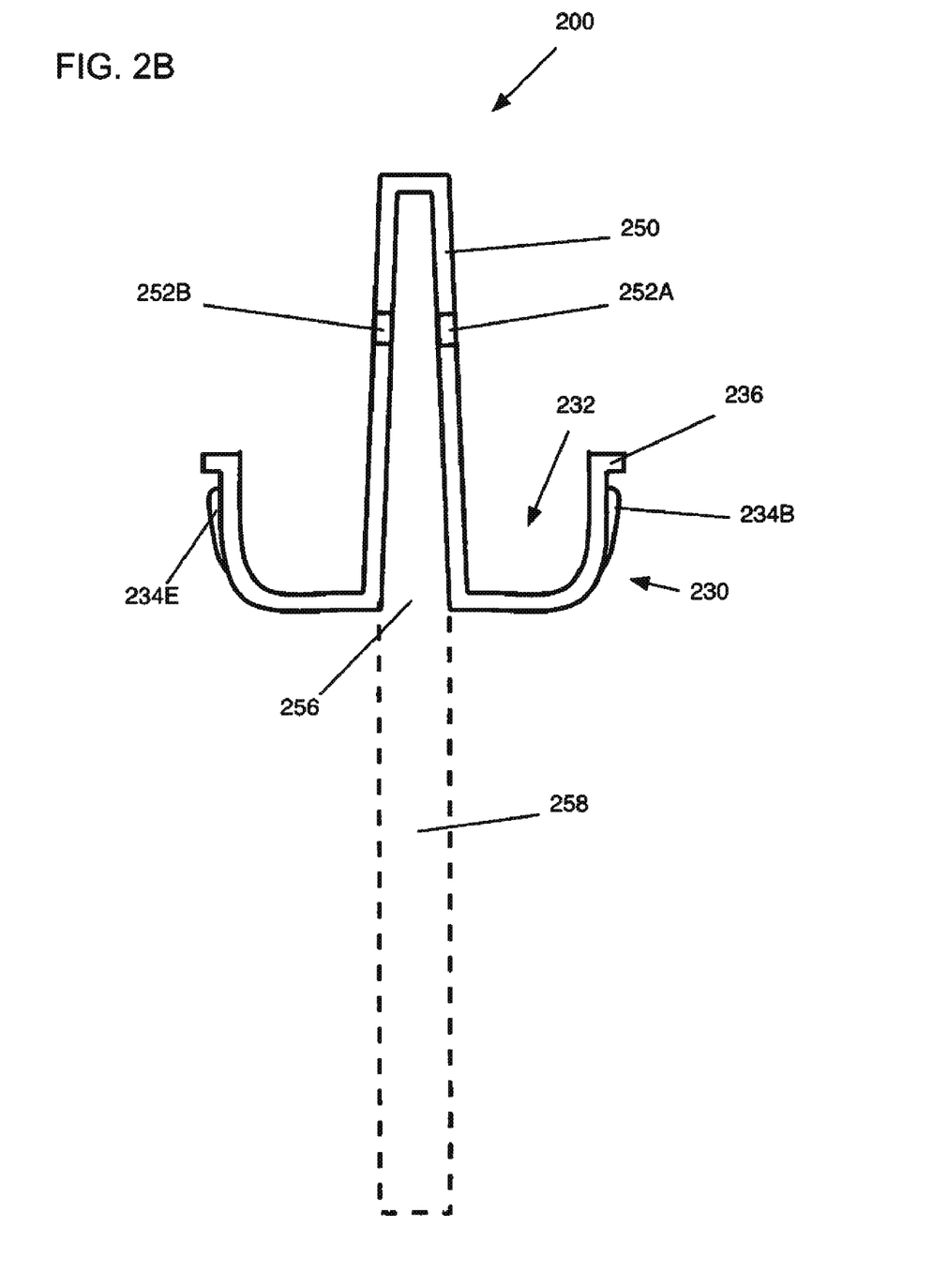

FIG. 2B shows a side cross-sectional view of apparatus 200. As shown, hollow spout portion 250 includes a pair of openings 252A-B and an optional tube member 258 residing on an underside of apparatus 200. Tube member 258, as in known apparatuses and as will be described in greater detail below, may extend downward from apparatus 200 into a reservoir of fluid.

Figure 2C:
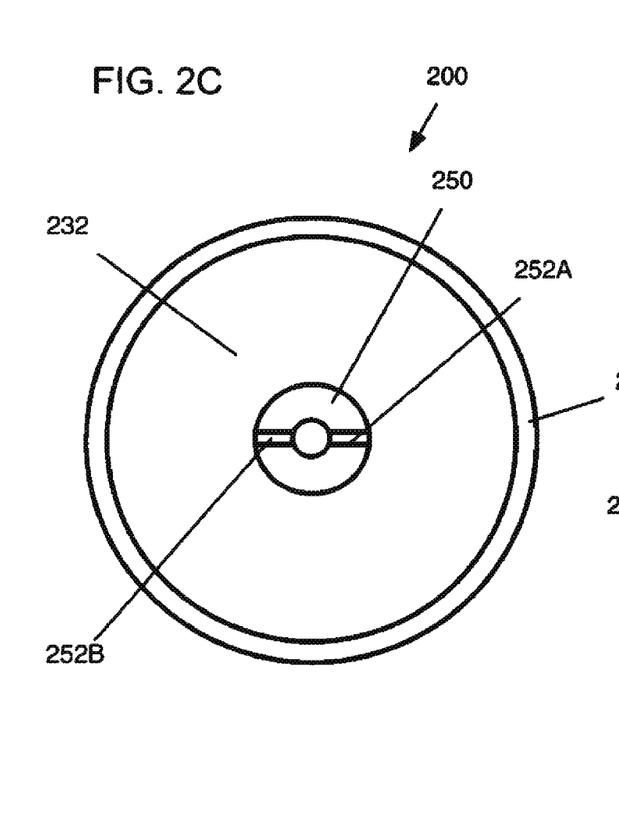
Figure 2D:
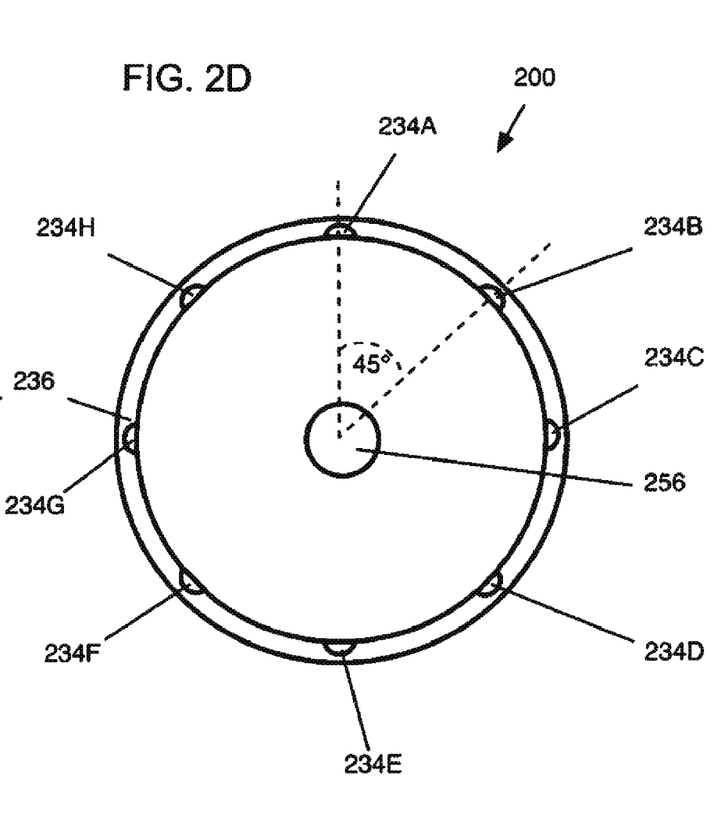

FIGS. 2C-D show, respectively, top and bottom cross-sectional views of apparatus 200. As shown, apparatus 200 has a circular shape in cross-section, although this is not essential. Apparatus 200 may have any cross-sectional shape, depending on the corresponding cross-sectional shape of an opening in a vessel to which apparatus 200 may be incorporated. In FIG. 2C, it can be seen that well 232 and rim 236 have different diameters, such that the diameter of rim 236 is greater than that of well 232. An opening into which apparatus 200 may be inserted would have a diameter intermediate that of well 232 and rim 236, such that well 232 may reside within the opening and rim 236 prevents passage of apparatus 200 through the opening.

In FIG. 2D, apparatus 200 is shown having eight ridges 234A-H. Ridges are provided in order to increase friction between apparatus 200 and an opening into which apparatus 200 may be inserted, thereby improving the retention of apparatus 200 within a vessel (described below) during transit and use. Where employed, an apparatus 200 according to the invention preferably includes at least two ridges and more preferably includes at least three ridges. In any case, it is preferred that the ridges be evenly distributed around a circumference of apparatus 200. For example, as shown in FIG. 2D, the eight ridges 234A-H are evenly distributed about the circumference of apparatus 200 (i.e., every 45 degrees about the circumference).

Figure 3A:
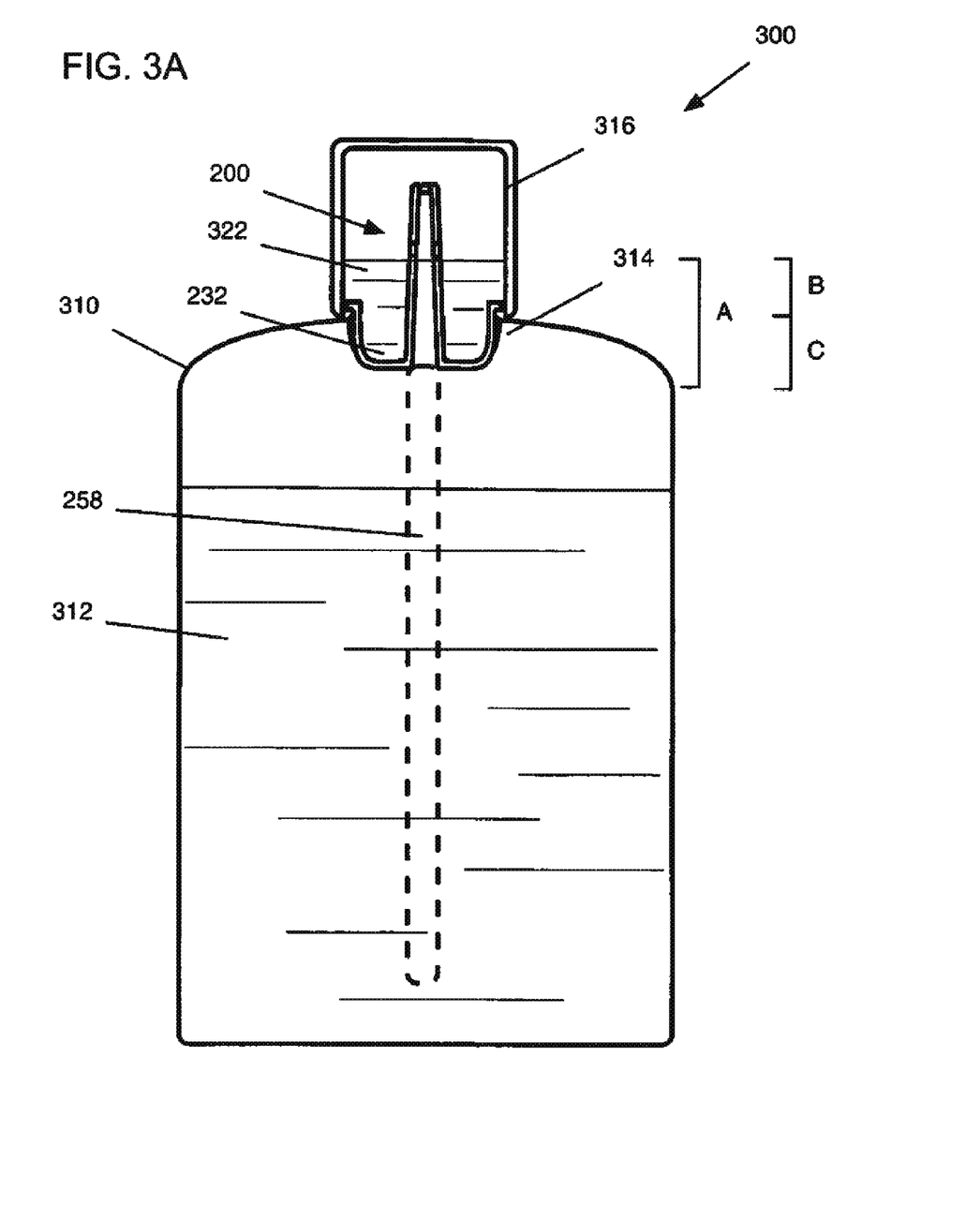
FIGS. 3A-B show various views of a dispensing device according to an embodiment of the invention.
Figure 3B:
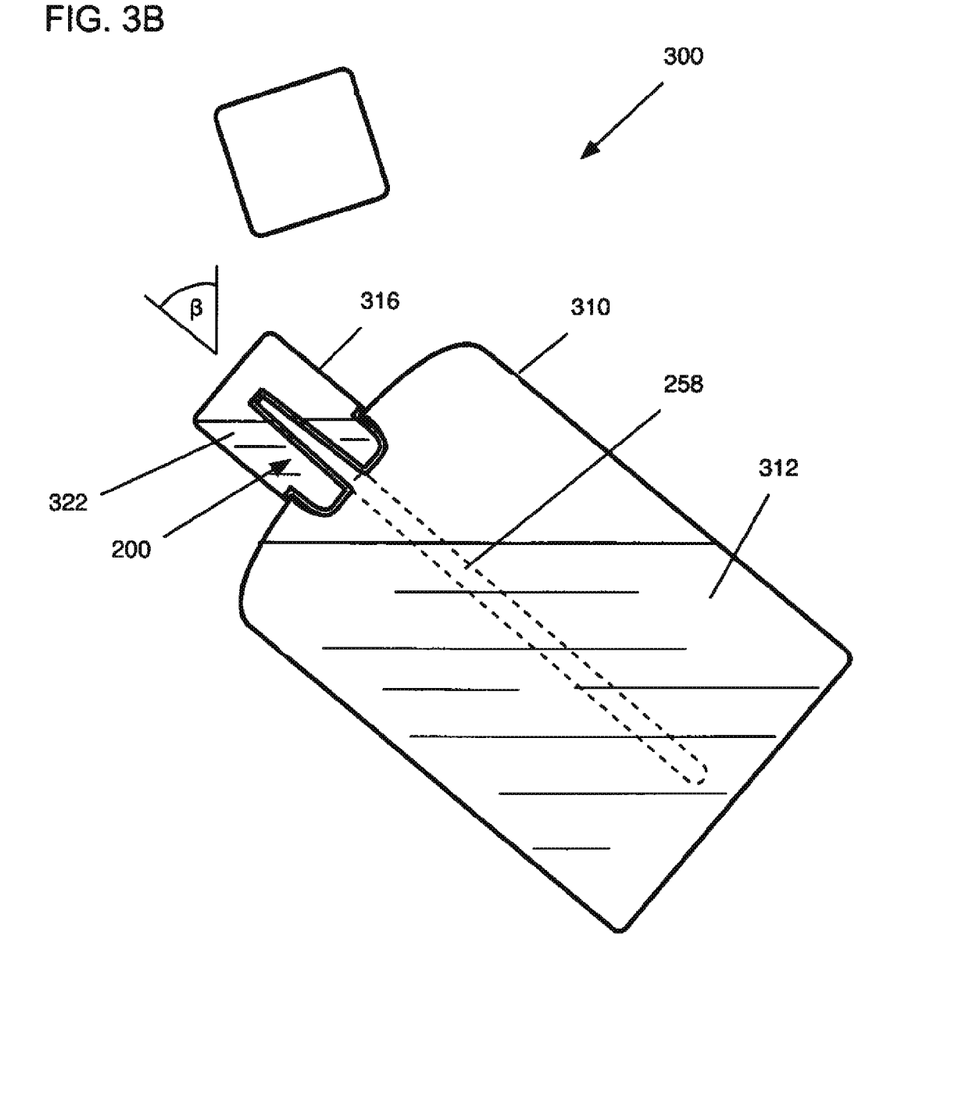

FIGS. 3A-B show a dispensing device 300 according to an embodiment of the invention. As shown, device 300 includes a vessel 310 (shown here as a bottle) having a neck 316 and an opening 314 into which apparatus 200 may be inserted. Once so inserted, well 232 resides within vessel 310 itself, rather than neck 316. That is, well 232 resides below the point at which neck 316 meets opening 314. As a result of this arrangement, at least a portion of the quantity of liquid 322 transferred from reservoir 312, i.e., the portion within well 232, resides within a space within vessel 310. For example, as shown in FIG. 3A, the total height A of the liquid 322 comprises a portion (B) above well 232 and a portion (C) within well 232. In effect, then, the height of liquid 322 is reduced by height C, as compared to known devices that do not include a well residing within the vessel 310.

The result of such an arrangement is shown in FIG. 3B. Here, device 300 is angled (at angle β, its "pouring angle") such that liquid 322 may be dispensed from device 300. As can be seen, the reduced height of liquid 322 described above enables device 300 to be angled to a greater angle from vertical than known devices (see angle α in FIG. 1C) before liquid 322 is first dispensed. Preferably, angle β is between about 67 and about 71 degrees, more preferably about 69 degrees.

While neck 316 is shown as part of vessel 310, it should be recognized that neck 316 (or any similar container portion) may be incorporated into apparatus 200 itself, such that neck 316 (or container portion) substantially surrounds hollow spout portion 250 (FIG. 2B) before apparatus 200 is inserted into opening 314 of vessel 310.

Figure 4:
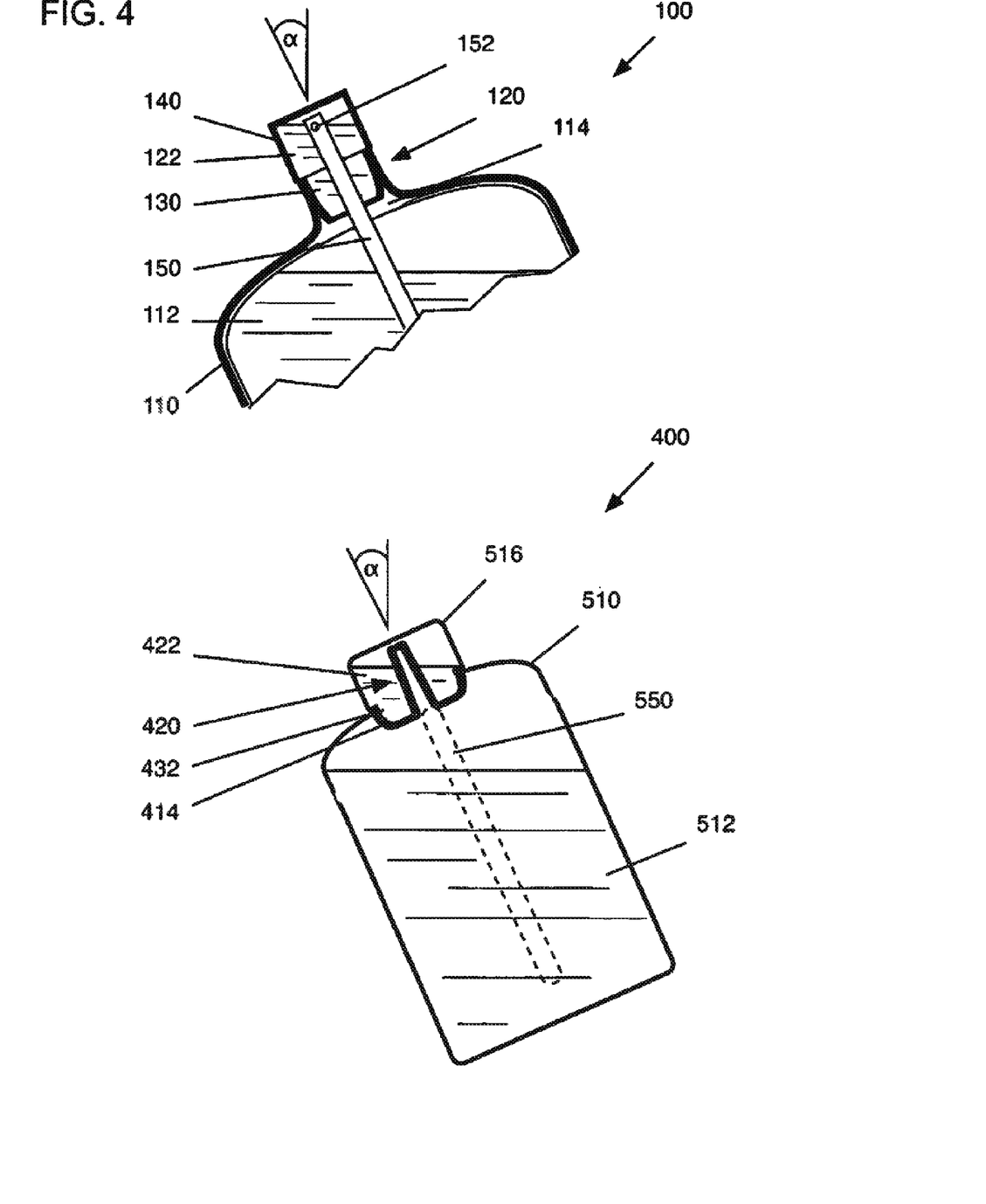
FIG. 4 shows an alternative embodiment of a dispensing device according to the invention in comparison with a known dispensing device.

FIG. 4 shows an alternative device 400 according to the invention in comparison with a known device 100, such as that of FIG. 1C, in order to illustrate yet another advantage of the present invention. Where a preferred pouring angle α has been achieved using a known device 100, any change in the diameter (i.e., greater or smaller) of dispensing apparatus 120 will necessarily result in a change in the height (i.e., decrease or increase) of liquid 122 and a corresponding change in the pouring angle (i.e., increase or decrease). The use of a dispensing apparatus 120 having a greater diameter may be desirable for any number of reasons, including, for example, appearance of device 100, ease of dispensation of liquid 122 into another container, mating with an opening 114 of predetermined size, etc.

Device 400 includes a dispensing apparatus 420 having a diameter greater than that of device 100, yet pouring angle α is approximately the same as that of device 100. As noted above with reference to FIG. 3A, this is attributable to the portion of liquid 422 residing within well 432 and the corresponding decrease in the height of liquid 422, as compared to a dispensing apparatus having no well 432 within vessel 410.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. An apparatus for dispensing a quantity of a liquid from a vessel having a body, a neck extending above the vessel body, an opening, and a reservoir below the opening, said apparatus comprising:

a base portion adapted for insertion into the vessel opening, said base portion having (a) a well extending into said base portion such that at least a portion of said well resides within the vessel body below the vessel neck when said base portion is inserted into the vessel opening; and (b) a rim above said well sized for engagement with the vessel neck above the vessel opening; and a hollow spout portion extending from said well of said base portion away from the vessel opening when said base portion is inserted into the vessel opening, said spout portion extending above said rim of said base portion and having at least one opening above said rim of said base portion such that a liquid within the vessel body may pass through said hollow spout portion, through said at least one opening, and into said well and the vessel neck;

wherein:

said rim of said base portion is retained within the vessel neck at a lower end thereof and said hollow spout portion extends above said rim of said base portion such that, until a user pours the quantity of the liquid container within the vessel neck and above said well of said base portion, a first portion of the quantity of the liquid is contained in said well below the vessel neck and a second portion of the quantity of the liquid is contained in and in direct contact with a portion of the vessel neck above said rim of said base portion.

2. The apparatus of claim 1, further comprising: a tube portion extending from said hollow spout potion into the vessel body.

3. The apparatus of claim 1, further comprising:

at least one ridge on an outer surface of said rim of said base portion for providing friction between said base portion and the vessel opening.

4. The apparatus of claim 1, further comprising:

at least one vent for passage of a gas from within said hollow spout portion.

5. The apparatus of claim 3, wherein said ridge is sized to permit said well to reside within the vessel opening at a lower end thereof and to prevent passage of said apparatus through the vessel opening.

6. The apparatus of claim 1, wherein said portion of said well residing within the vessel body results in a reduced height of the second portion of the quantity of liquid.

7. The apparatus of claim 6, wherein the reduced height of the second portion of the quantity of liquid results in said apparatus having an increased pouring angle, as compared to an apparatus having no portion of a well residing within the vessel body.

8. The apparatus of claim 1, wherein the quantity of liquid is a predetermined quantity.

9. A device for dispensing a quantity of liquid from a liquid reservoir, said device comprising:
    a vessel including:
        a body adapted to contain a liquid reservoir;
        a neck extending above said body;
        an opening below said neck; and
        a reservoir below said opening for containing the liquid; and
    a dispensing apparatus including:
        a base portion adapted for insertion into the opening of said vessel, said base portion having (a) a well extending into said base portion such that at least a portion of said well resides at within said vessel body below said vessel neck when said base portion is inserted into said vessel opening; and (b) a rim sized for engagement within said vessel neck above said vessel opening; and
        a hollow spout portion extending from said well of said base portion away from said vessel opening when said base portion is inserted into said vessel opening, said spout portion extending above said rim of said base portion and having at least one opening above said rim of said base portion such that a liquid within said vessel body may pass through said hollow spout portion, through said at least one opening, and into said well and said vessel neck;
    wherein:
        said rim of said base portion is retained within said vessel neck at a lower end thereof and said hollow spout portion extends above said rim of said base portion such that, until a user pours the quantity of the liquid container within the vessel neck and above said well of said base portion, a first portion of the quantity of the liquid is contained in said well below said vessel neck and a second portion of the quantity of the liquid is contained in and in direct contact with a portion of said vessel neck above said rim of said base portion.

10. The device of claim 9, wherein said vessel includes a bottle.

11. The device of claim 9, wherein said apparatus further includes: a tube portion extending from said hollow spout portion into said vessel body.

12. The device of claim 9, wherein said apparatus further includes: at least one ridge on an outer surface of said rim of said base portion for providing friction between said base portion and said vessel opening at and within a lower end of said vessel opening.

13. The device of claim 9, wherein said apparatus further includes: at least one vent for passage of a gas from within said hollow spout.

14. The device of claim 9,
    wherein at least a portion of said vessel neck resides above said base portion and substantially surrounds said hollow spout portion.

15. The device of claim 9, wherein the portion of said well residing within said vessel body results in a reduced height of the second portion of the quantity of liquid.

16. The device of claim 15 wherein the reduced height of the second portion of the quantity of liquid results in the apparatus having an increased pouring angle, as compared to a device having no portion of a well residing within said vessel body.

17. The device of claim 9, wherein the quantity of liquid is a predetermined quantity.

18. A device for dispensing a quantity of liquid, said device comprising:
    a vessel having a body defining a liquid reservoir therein and a neck extending above said body; and
    a dispensing apparatus having a base portion with a well defined on an inner surface thereof adapted to hold at least a portion of the quantity of liquid, and a passage between said well and said vessel body permitting liquid to pass from said liquid reservoir in said vessel body into said well;
    wherein:
    said dispensing apparatus is provided through an opening in said vessel such that at least a portion of said well is positioned within said liquid reservoir in said vessel body;
    said base portion has a rim fitted within a lower portion of said vessel neck to prevent said base portion from passing through said opening;
    a portion of said vessel neck extends above said rim of said base portion such that liquid is dispensed from said reservoir into said well and extends above said rim of said base portion to be contained directly in said well and also directly in said vessel neck portion above said base portion;
    said dispensing apparatus lowers the height of liquid to be contained directly in said vessel by virtue of said base portion well being provided within said liquid reservoir below said vessel neck; and
    a quantity of liquid to be dispensed is contained within said well, below said vessel neck, and also in said vessel neck above said rim and directly within said vessel neck.

19. A device for dispensing a quantity of liquid, said device comprising:
    a vessel having a body defining a liquid reservoir therein and a neck extending above said body; and
    a dispensing apparatus having a base portion with a well defined on an inner surface thereof adapted to hold at least a portion of the quantity of liquid, and a passage between said well and said vessel body permitting liquid to pass from said liquid reservoir in said vessel body into said well;
    wherein:
    said dispensing apparatus is provided through an opening in said vessel such that at least a portion of said well is positioned within said liquid reservoir in said vessel body;
    said vessel neck extends from and above said opening;
    said base portion has a rim fitted within a lower portion of said vessel neck to prevent said base portion from passing through said opening;
    said well resides below the point at which said neck meets said opening; a portion of said vessel neck extends above said rim of said base portion such that liquid is dispensed from said reservoir into said well and extends above said rim of said base portion to be contained directly in said well and also directly in said vessel neck portion above said base portion;
    said well is adapted to contain a first portion of the quantity of liquid and said vessel neck is adapted to contain a second portion of the quantity of liquid; and
    said dispensing apparatus lowers the height of liquid to be contained in said vessel neck while minimally affecting the volume of liquid to be contained in said vessel neck by virtue of said base portion well being provided within said liquid reservoir below the point at which said neck meets said opening.

20. The device of claim 18, further comprising a hollow spout extending upwardly from said well and defining said passage between said well and said vessel body.

21. The apparatus of claim 3, wherein:
said ridge has a first diameter;
said well has a second diameter;
the vessel opening has a third diameter;
said first diameter is greater than said second diameter; and
said third diameter is intermediate said first and second diameters such that said well is insertable into the vessel opening and said ridge prevents passage of said apparatus through the vessel opening.

22. The apparatus of claim 12, wherein:
said ridge has a first diameter;
said well has a second diameter;
said vessel opening has a third diameter;
said first diameter is greater than said second diameter; and
said third diameter is intermediate said first and third second diameters such that said well is insertable into said vessel opening and said ridge prevents passage of said apparatus through said vessel opening.

23. A device for dispensing a quantity of liquid, said device comprising:
a vessel having a body defining a liquid reservoir therein and a neck extending above said body; and
a dispensing apparatus having a base portion with a well defined on an inner surface thereof adapted to hold at least a portion of the quantity of liquid, and a passage between said well and said vessel body permitting liquid to pass from said liquid reservoir in said vessel body into said well;
wherein:
said dispensing apparatus is provided through an opening in said vessel such that at least a portion of said well is positioned within said liquid reservoir in said vessel body;
said base portion has a top end fitted within a lower portion of said vessel neck to prevent said base portion from passing through said opening;
a portion of said vessel neck extends above said top end of said base portion such that liquid is dispensed from said reservoir into said well and extends above said top end of said base portion to be contained directly in said well and also directly in said vessel neck portion above said base portion;
said dispensing apparatus lowers the height of liquid to be contained in said vessel neck while minimally affecting the volume of liquid to be contained in said vessel neck by virtue of said base portion well being provided within said liquid reservoir and said base portion top end being positioned at a lower portion of said neck;
said apparatus further includes at least one ridge on an outer surface of the said base portion for providing friction between said base portion and said vessel opening;
said ridge has a first diameter;
said well has a second diameter;
the vessel opening has a third diameter;
said first diameter is greater than said second diameter; and
said third diameter is intermediate said first and third second diameters such that said well is insertable into said vessel opening and said ridge prevents passage of said apparatus through said opening.

* * * * *

UNITED STATES PATENT AND TRADEMARK OFFICE
CERTIFICATE OF CORRECTION

PATENT NO. : 7,850,050 B2  
APPLICATION NO. : 11/525304  
DATED : December 14, 2010  
INVENTOR(S) : Curtis L. Brown Page 1 of 1

It is certified that error appears in the above-identified patent and that said Letters Patent is hereby corrected as shown below:

In the Claims

In claim 1, line 39, please delete the word "container" and replace with the word "contained";

In claim 9, line 33, please delete the word "container" and replace with the word "contained".

Signed and Sealed this  
Twenty-seventh Day of August, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 7,850,050 B2  
APPLICATION NO. : 11/525304  
DATED : December 14, 2010  
INVENTOR(S) : Curtis L. Brown Page 1 of 1

It is certified that error appears in the above-identified patent and that said Letters Patent is hereby corrected as shown below:

In the Claims

In claim 1, Column 4, line 39, please delete the word "container" and replace with the word "contained";

In claim 9, Column 5, line 33, please delete the word "container" and replace with the word "contained".

This certificate supersedes the Certificate of Correction issued August 27, 2013.

Signed and Sealed this
Seventeenth Day of September, 2013

Teresa Stanek Rea
*Deputy Director of the United States Patent and Trademark Office*